United States Patent [19]
Prince et al.

[11] 4,110,606
[45] Aug. 29, 1978

[54] UTILITY METER READOUT SYSTEM

[76] Inventors: Leland S. Prince, 9014 Charloma Dr., Downey, Calif. 90240; Neil K. Yarnell, 238 N. Broadoaks, Monrovia, Calif. 91016

[21] Appl. No.: 622,523

[22] Filed: Oct. 15, 1975

[51] Int. Cl.² ............................................ G06K 15/02
[52] U.S. Cl. .................................................. 235/432
[58] Field of Search ...................... 235/61.9 R, 61.8 R, 235/61.6 R, 156, 61.11 A, 419, 432

[56] References Cited

U.S. PATENT DOCUMENTS

| | | | |
|---|---|---|---|
| 3,511,974 | 5/1970 | Wang | 235/61.11 A |
| 3,842,248 | 10/1974 | Yarnell et al. | 235/61.9 R |
| 3,932,730 | 1/1976 | Ambrosio | 235/61.9 R |

Primary Examiner—Daryl W. Cook
Attorney, Agent, or Firm—Albert L. Gabriel

[57] ABSTRACT

A portable automatic billing and printing device which provides for an automatic calculation and printout of a customer bill for utilities such as water, gas and electricity. A customer utility card is positioned within the apparatus and pertinent data is automatically read from the card and provided as electrical signals to a calculating unit. Means are provided for the manual input of present meter readings to provide additional signals to the calculating unit. Output data from the calculating unit is imprinted on the customer card and pertinent data is also provided on a memory storage device which may be removed from the main device housing for further processing in the central office.

18 Claims, 21 Drawing Figures

RECORDING MEMORY

| 1 | SYNCHRONIZING PULSES |
|---|---|
| 2 | DITTO |
| 3 | DITTO |
| 4 | DITTO |
| 5 | CUSTOMER IDENTIFICATION |
| 6 | DITTO |
| 7 | DITTO |
| 8 | DITTO |
| 9 | DITTO |
| 10 | DITTO |
| 11 | DITTO |
| 12 | DITTO |
| 13 | DITTO |
| 14 | DITTO |
| 15 | PRESENT READING |
| 16 | DITTO |
| 17 | DITTO |
| 18 | DITTO |
| 19 | DITTO |
| 20 | TOTAL DUE |
| 21 | DITTO |
| 22 | DITTO |
| 23 | DITTO |
| 24 | DITTO |

Fig. 18.

DUAL RATE BILLING FACTOR

| 0 | .00 |
|---|---|
| 1 | .02 |
| 2 | .03 |
| 3 | .05 |
| 4 | .07 |
| 5 | .08 |

RATE MEMORY

|     | 1 | 2 | 3 | 4 | 5 | 6 | 7 | 8 | 9 |                         |
|-----|---|---|---|---|---|---|---|---|---|-------------------------|
| M1  |   |   |   |   |   |   |   |   |   | EXCESS USE PENALTY 1    |
| M2  |   |   |   |   |   |   |   |   |   | DITTO 2                 |
| M3  |   |   |   |   |   |   |   |   |   | CUSTOMER CHARGE 1       |
| M4  |   |   |   |   |   |   |   |   |   | DITTO 2                 |
| M5  |   |   |   |   |   |   |   |   |   | FUEL RATE ADJUST 1      |
| M6  |   |   |   |   |   |   |   |   |   | DITTO 2                 |
| M7  |   |   |   |   |   |   |   |   |   | QUANTITY FIRST BLOCK    |
| M8  |   |   |   |   |   |   |   |   |   | FIRST BLOCK RATE 1      |
| M9  |   |   |   |   |   |   |   |   |   | DITTO 2                 |
| M10 |   |   |   |   |   |   |   |   |   | QUANTITY SECOND BLOCK   |
| M11 |   |   |   |   |   |   |   |   |   | SECOND BLOCK RATE 1     |
| M12 |   |   |   |   |   |   |   |   |   | DITTO 2                 |
| M13 |   |   |   |   |   |   |   |   |   | QUANTITY THIRD BLOCK    |
| M14 |   |   |   |   |   |   |   |   |   | THIRD BLOCK RATE 1      |
| M15 |   |   |   |   |   |   |   |   |   | DITTO 2                 |
| M16 |   |   |   |   |   |   |   |   |   | QUANTITY FOURTH BLOCK   |
| M17 |   |   |   |   |   |   |   |   |   | FOURTH BLOCK RATE 1     |
| M18 |   |   |   |   |   |   |   |   |   | DITTO 2                 |
| M19 |   |   |   |   |   |   |   |   |   | EXCESS QUANTITY RATE 1  |
| M20 |   |   |   |   |   |   |   |   |   | DITTO 2                 |

DIGITS IN COLUMN 5

| 1  | 0 | 0 | 0 | 1 | 0 | 0 | 0 | 0 |
|----|---|---|---|---|---|---|---|---|
| 2  | 0 | 0 | 0 | 1 | 0 | 0 | 0 | 0 |
| 3  | 0 | 0 | 1 | 3 | 0 | 0 | 0 | 0 |
| 4  | 0 | 0 | 1 | 3 | 0 | 0 | 0 | 0 |
| 5  | 0 | 0 | 0 | 0 | 0 | 6 | 4 | 2 |
| 6  | 0 | 0 | 0 | 0 | 0 | 6 | 9 | 3 |
| 7  | 0 | 6 | 0 | 0 | 0 | 0 | 0 | 0 |
| 8  | 0 | 0 | 0 | 0 | 5 | 4 | 6 | 3 |
| 9  | 0 | 0 | 0 | 0 | 5 | 7 | 9 | 1 |
| 10 | 0 | 9 | 0 | 0 | 0 | 0 | 0 | 0 |
| 11 | 0 | 0 | 0 | 0 | 4 | 7 | 5 | 0 |
| 12 | 0 | 0 | 0 | 0 | 5 | 0 | 3 | 5 |
| 13 | 1 | 5 | 0 | 0 | 0 | 0 | 0 | 0 |
| 14 | 0 | 0 | 0 | 0 | 2 | 7 | 6 | 6 |
| 15 | 0 | 0 | 0 | 0 | 2 | 9 | 3 | 2 |
| 16 | 6 | 6 | 0 | 0 | 0 | 0 | 0 | 0 |
| 17 | 0 | 0 | 0 | 0 | 2 | 1 | 1 | 2 |
| 18 | 0 | 0 | 0 | 0 | 2 | 2 | 3 | 9 |
| 19 | 0 | 0 | 0 | 0 | 1 | 8 | 3 | 4 |
| 20 | 0 | 0 | 0 | 0 | 0 | 9 | 4 | 4 |

DATA IN B.C.D. FORMAT

| 1  | 0 | 0 | 0 | 0 |
|----|---|---|---|---|
| 2  | 0 | 0 | 0 | 0 |
| 3  | 0 | 0 | 0 | 0 |
| 4  | 0 | 0 | 0 | 0 |
| 5  | 0 | 1 | 1 | 0 |
| 6  | 0 | 1 | 1 | 0 |
| 7  | 0 | 0 | 0 | 0 |
| 8  | 0 | 1 | 0 | 0 |
| 9  | 0 | 1 | 1 | 1 |
| 10 | 0 | 0 | 0 | 0 |
| 11 | 0 | 1 | 1 | 1 |
| 12 | 0 | 0 | 0 | 0 |
| 13 | 0 | 0 | 0 | 0 |
| 14 | 0 | 1 | 1 | 1 |
| 15 | 1 | 0 | 0 | 1 |
| 16 | 0 | 0 | 0 | 0 |
| 17 | 0 | 0 | 0 | 1 |
| 18 | 0 | 0 | 1 | 0 |
| 19 | 1 | 0 | 0 | 0 |
| 20 | 0 | 1 | 0 | 1 |

Fig. 15

MEMORY UNIT

| R1  | FIRST PART CUSTOMER IDENT |
| R2  | SECOND DITTO              |
| R3  | DUAL RATE FACTOR          |
| R4  | RATE SELECTOR             |
| R5  | ALLOWED QUANTITY          |
| R6  | PREVIOUS READING          |
| R7  | TAX RATE                  |
| R8  | PAST DUE AMOUNT           |
| R9  | PRESENT READING           |
| R10 | WRONG DAY ADJUSTMENT      |
| R11 | AMOUNT OF PENALTY         |
| R12 | AMOUNT OF TAX             |
| R13 | TOTAL AMOUNT DUE          |

Fig. 16

PRINTING CONTROLLER

| P1 | PRESENT READING    |
| P2 | QUANTITY USED      |
| P3 | COST OF QUAN. USED |
| P4 | EXCESS USE PENALTY |
| P5 | AMOUNT OF TAX      |
| P6 | TOTAL DUE          |

Fig. 17

BUFFER

| S1 | SYNCHRONIZING  |
| S2 | CUSTOMER IDENT |
| S3 | DITTO          |
| S4 | PRESENT READING |
| S5 | TOTAL DUE      |

UTILITY METER READOUT SYSTEM

BACKGROUND OF THE INVENTION

1. Field of the Invention

The invention relates to portable meter reading devices which are utilized to compute and prepare a customer utility bill at the customer location upon input of selected utility meter readings.

2. Prior Art

As is customary in utility billing procedures, the utility companies dispatch men to business and residence locations of its customers to take periodic readings of electric, gas and water meters. These readings are then entered on work sheets and sent to the central office for computation of a customer bill for mailing to the various customer locations. Thus, the total billing procedure usually takes a matter of between four and seven days and involves numerous personnel at the central office to carry out the billing and mailing operation.

Although modern day telemetering methods permit an automatic reading of various utility meters followed by transmission of coded data indicative of the meter readings to the central office, these automatic readers are quite expensive to install and also entail a rental fee for use of the telephone communication lines. In addition, many of the automatic metering systems do not provide a tamper-proof device which ensures an accurate billing.

Prior art billing devices are illustrated, for example, in U.S. Pat. No. 1,087,902 to Hall and in U.S. Pat. No. 3,590,220 to Yokohama et al. Such devices, although portable, are cumbersome to operate and involve many electromechanical parts susceptible to malfunction and breakage. The Hall device must be physically connected to each utility meter in order to actuate its electromechanical mechanism. The Yokohama device involves numerous printing and reading procedures with sequential shifting of the customer recording tape and card in order to complete a customer bill.

A simple portable billing device has been developed by the inventors herein and is described in U.S. Pat. No. 3,842,248 issued to Neil K. Yarnell and Leland S. Prince. Such a device uses a manual input of a plurality of parameters to provide the final output customer bill. The instant invention represents an improvement of this prior art device in that a minimum number of input parameters need be manually fed into the machine by the operator, and, additionally, further processing at the central office is facilitated by use of recording pertinent billing information on a removable memory storage device.

SUMMARY OF THE INVENTION

It is an object of the instant invention to overcome the disadvantages of the prior art and to provide a portable meter billing apparatus which is lightweight and inexpensive and readily adapted for use in present-day meter reading procedures.

A further object of the invention is to provide a meter billing and printing device which may be utilized to compute several different utility bills for a single customer and prepare separate bills for each of these utilities.

A further object of the invention is to provide a simple, portable meter calculating and billing device requiring a minimum number of manual data inputs to thereby reduce operator errors and increase calculating and printing efficiency.

Yet a further object of the invention is to provide a calculating and printing device requiring a single positioning of the customer utility bill to eliminate bill registration errors within the apparatus and to eliminate complex mechanical shifting mechanisms.

Yet another object of the invention is to provide a portable computing and printing device having a removable memory storage means for recording pertinent billing information for further processing at a central office.

Another object of the invention is to provide a meter billing device which may be utilized to compute complex rate data and has a means for compensating such rate data for late day billings.

A further object of the invention is to provide a meter billing and printing device which embodies a dual billing rate capability to accommodate a change in the billing rate during the billing period; and in conjunction with such dual billing rate capability, it is an object to provide wrong day billing control means adapted to compensate for late billing by the operator without requiring that a new customer billing card be prepared and substituted for the customer card already prepared at the utility office for correct day billing.

A further object of the invention is to provide a meter billing and printing device which is adapted to apply an additional billing factor that is set forth herein by way of example as a penalty for excess use of a particular utility over and above an allocated amount, but which can be employed for other purposes. Such additional billing factor when applied as an excess use penalty enables the serving utility to easily handle the billing of a rationed or allocated commodity such as gas or electricity, facilitating the incorporation by the utility of an energy limiting system such as power or gas rationing into its marketing system. Another example of a use for such additional billing factor is for the purpose of providing "lifeline" service for low income people, wherein a low utility rate is applied to a quantity of service to meet life support needs, with all service above that being billed at the same rate as the normal customers.

A still further object of the invention is to provide a meter billing and printing device which produces a completed bill at the customer location that is adapted to be left with the customer, thereby completely avoiding postal involvement and providing a system which is immune from increasingly high postal costs.

The present invention is designed to allow a single operator to read gas, electric and water meters at a given customer site and to compute and prepare bills for each of these utilities. The operator carries the portable meter calculating and printing device together with preprinted customer cards containing such information as customer identification and previous meter readings. The operator positions the customer card in the apparatus and turns on the device to actuate automatic reading and sensing means to provide electrical input signals to the computing means. The operator then need only manually input the present meter reading to complete the required input parameters. The computing means provides output signals to printing means for imprinting output data on the customer card and, additionally, provides output signals to a memory storage device which may be later removed from the appartus housing. The apparatus eliminates the necessity for making duplicate copies of the customer bill inasmuch as the removable memory contains all pertinent data for future use by the central office, and this permits the operator to leave the bill with the customer at the time the meter is read, thereby avoiding the expense and delay of mailing the bill out from the central office. A portion of the customer bill is returned with the customer payment to provide a cross check of the output information stored in the removable memory.

The operator may then prepare a second utility bill for a different utility by merely inserting another appropriately identified card into the billing apparatus. A utility code imprinted on the customer card automatically identifies the particular utility and its appropriate rate data.

BRIEF DESCRIPTION OF THE DRAWINGS

Other objects and advantages of the invention will become apparent from the following detailed description taken in conjunction with the accompanying drawings, wherein:

FIG. 14 illustrates the rate memory map of the rate memory utilized in the instant billing device;

FIG. 15 illustrates the memory map of the memory unit of the computing means of the instant invention;

FIG. 16 illustrates the memory map of the printing controller of the instant invention;

FIG. 17 illustrates the memory map of the buffer utilized in the instant invention;

DETAILED DESCRIPTION OF THE PREFERRED EMBODIMENT

Figure 1:
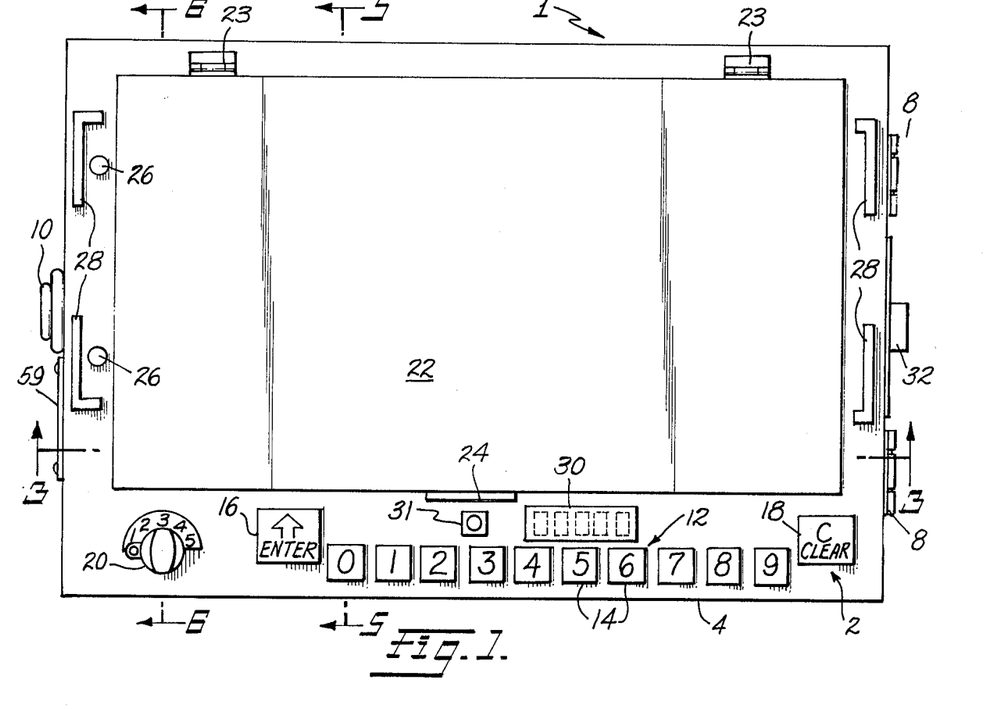
FIG. 1 is a plan view showing the top of the billing device.
Figure 2:
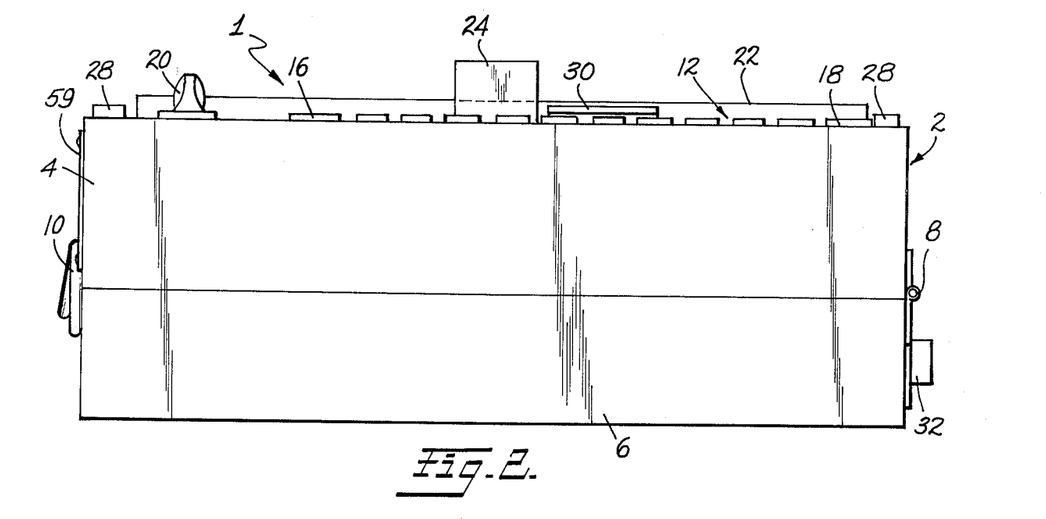
FIG. 2 is a side view of the billing device of FIG. 1.
Figure 3:
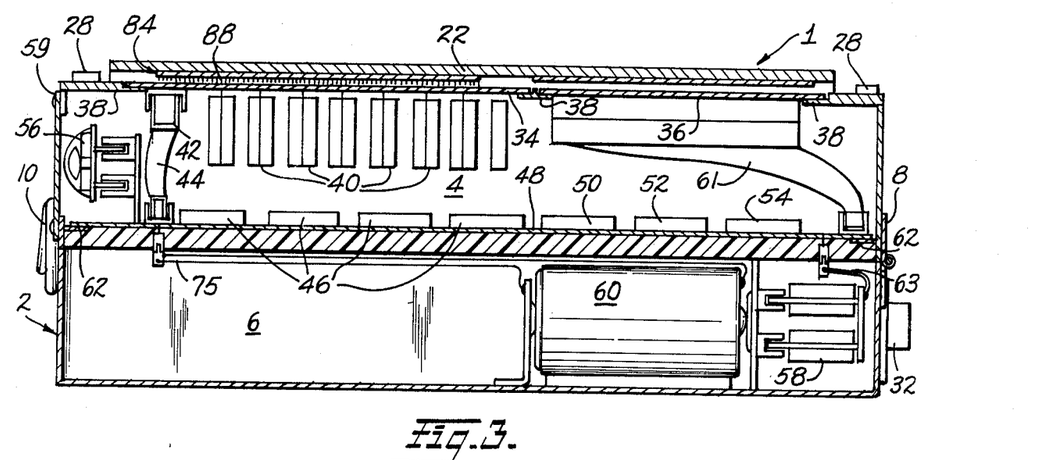
FIG. 3 is a cross-sectional view of the billing device taken along line 3—3 of FIG. 1.
Figure 4:
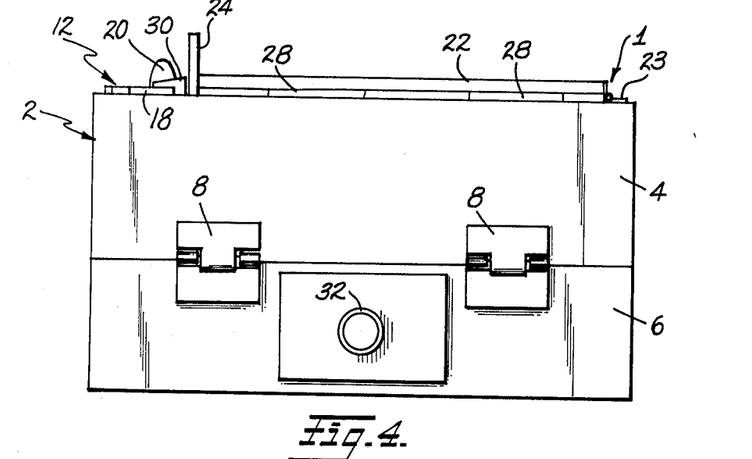
FIG. 4 is an end view of the billing device of FIG. 1.

As illustrated in FIGS. 1–6, the billing device 1 of the instant invention comprises a housing 2 having an upper portion 4 and a lower portion 6. The upper and lower portions are joined together by means of disconnectable hinges 8, as best seen in FIG. 4, and a clamp 10, as best seen in FIG. 2. On the top portion of the housing 2 is a keyboard 12 which contains a plurality of data push buttons 14 for use by the operator in entering the present meter reading into the billing apparatus. Adjacent the keyboard 12 is a data entry button 16 and a clear button 28. Also illustrated in FIG. 1 is a wrong day billing control means 20 which is a multiple position switch that may be set to cover a particular range of late billing days from, for example, zero to five.

The wrong day billing control means 20 may, for example, be a multi-source four-layer, six-position selector switch such as an AMP Electric Hexidecimal rotary-connected switch. A cover plate 22 is illustrated in the closed position in FIGS. 1–6 and is designed, among other things, to help secure the customer billing device to the top surface of housing 2.

The customer card is positioned within the billing apparatus after the operator opens the cover plate 22. Cover plate 22 is secured to the top surface of housing 2 and biased open by means of spring loaded hinges 23. Cover plate 22 is secured in a closed position by holding means such as a cover plate clamp and actuator 24. Upon opening the cover plate 22 the customer bill is inserted on the top surface of the housing 2 and positioned by means of pins 26 and raised members 28.

Positioned adjacent the keyboard 12 on the top surface of the housing 2 is a display means 30 which may, for example, be a five-digit display, each unit consisting of a seven-segment display. Also disposed on the top surface of housing 2 adjacent the keyboard 12 is a "billing completed" indicator lamp 31.

The keyboard 12, data entry button 16, clear button 18 and display means 30 are all multiple source items of the type used in hand-held calculators such as those manufactured by Hewlett-Packard and Texas Instruments.

As best illustrated in FIG. 2, a data collection terminal 32 is provided in the side of the lower portion 6 of the billing device for use in transmitting collected data to the main computers in the central office.

FIG. 3 illustrates a cross-sectional view of the apparatus taken along line 3—3 of FIG. 1 and shows a card reading circuit board 34 and a card printing circuit board 36. The boards 34 and 36 are secured by means of supports 38 which also serve to electrically isolate the boards from each other. Electrically connected to the card reading board 34 are a plurality of data converters 40 which are utilized to convert the sensed data on the customer card to data compatible with a computing means as described more fully below. The data converters 40 may, for example, be multiple source B.C.D. converters such as Harris Semiconductor HD0165 converters. The outputs of the data converters are fed to a cable connector 42 which passes the electrical data signals by means of a multiple wire flat cable 44 (for example, as manufactured by Hughes Aircraft) to a computing means 46 located on a computing circuit board 48. The computing circuit board 48 contains the computing means 46 as well as a memory unit 50, memory buffer 52 and printing controller 54. The device 1 also comprises two additional memories, namely, a rate memory 56 and a recording memory 58. The memory unit 50 is utilized to temporarily store data utilized in the computing means 46. Rate memory 56 contains the utility rate information and may be conveniently removed from the housing 2 by removing member 59. Thus, when utility rates change a newly programmed rate memory may be installed in the device 1.

The computing means 46 and associated memory unit 50 may, for example, by a Digital Equipment Corp. PDP-8A Mini-Computer. However, such PDP-8A Mini-Computer has greater capacity than required, and if desired the program listed in FIGS. 20A and 20B may be more economically accomplished and further miniaturized onto a single circuit board using large scale integrated circuit techniques similar to those used in the manufacture of complex hand-held calculators such as Texas Instruments' SR 51 and Hewlett-Packard's HP 65, thereby minimizing size, weight and power consumption of the billing device 1.

Rate memory 56 may be a multi-source 8192 bit (of which 5760 bits are used) electrically programmable, ultraviolet light erasable memory chip, as for example INTEL 2708.

Memory buffer 52 is utilized to store information which is subsequently transmitted to the recording memory 58. Memory buffer 52 is a 96 bit storage register controlled by the computing means 46. The first 16 bits are permanently fixed as zero and the data produced by the computing means 46 is transferred into the remaining 80 bits. This register is transferred to the recording memory 58 and the first 16 bits (zeros) synchronize the utility office computer for each billing. A presently available chip which may be used in part for the memory buffer 52 in INTEL 256 bit RAM (random access memory) No. 1M6523.

Recording memory 58 may, for example, comprise a serial memory assembly of four INTEL Model 2146 CCDs (charge coupled devices) having a total storage capability of 65536 bits, which is suitable for recording up to 655 individual meter readings which, for three utilities, corresponds to about 218 residences and is well in excess of a single day operator billing. Data contained in recording memory 58 is transmitted via the data collection terminal 32 to computing means with the central office (not shown). The recording memory is continuously energized by battery means 60. Both the battery means 60 and the recording memory 58 are removable together from the remainder of the billing device 1 inasmuch as the lower portion 6 of the billing device 1 may be completely removed and separated from the upper portion 4 of the apparatus by means of clamp 10 and hinges 8. Thus, the upper portion 4 may be utilized by an operator on one day with another lower portion 6, while information contained in the recording memory 58 during the previous day's operation may be read and processed by the central office computers, and the battery means 60 recharged.

Also shown in FIG. 3 is another multi-wire flat cable 61 used to interconnect the printing circuit board 36 with the printing controller 54 of the computing circuit board 48. Similarly a cable 63 interconnects the recording memory 58 with the memory buffer 52 of the computing circuit board 48.

Figure 5:
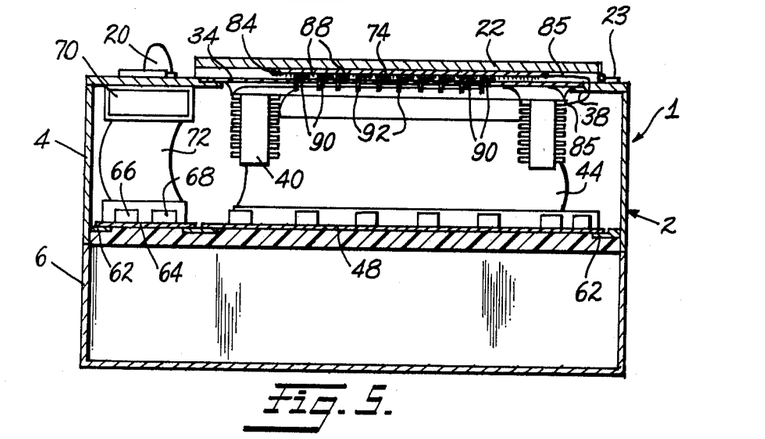
FIG. 5 is a cross-sectional view of the billing device taken along line 5—5 of FIG. 1.

FIG. 5 shows an end cross-sectional view of the apparatus taken along line 5—5 of FIG. 1. The computing circuit board 48 is shown therein positioned on a support member 62 and contained within the upper portion 4 of the device 1. Separated from the computing circuit board 48 is an input circuit board 64 which contains a converter 66 and an input buffer 68 which is utilized in converting and storing information entered by the operator on the keyboard 12. The converter 66 and input buffer 68 are both multiple source items of the type used in hand-held calculators such as those manufactured by Hewlett-Packard and Texas Instruments. Also shown is the wrong day billing control means 20. Data from the keyboard 12 and wrong day billing control means 20 is fed to the input circuit board 64 by means of a connector 70 and multiple wire cable 72.

Also shown in FIG. 5 are the reading means 74 utilized in conjunction with the customer card for providing input data to the computing means 46 via the data converters 40, cable connector 42 and cable 44.

Figure 6:
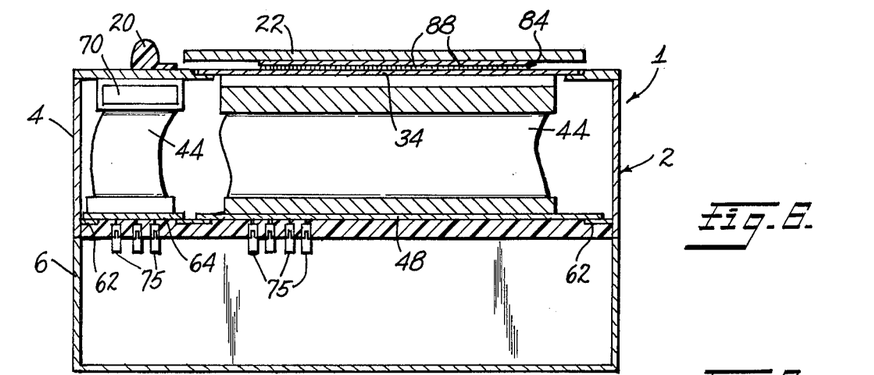
FIG. 6 is a cross-sectional view of the billing device taken along line 6—6 of FIG. 1.

FIG. 6 shows another cross-sectional view of the billing device 1 taken along line 6—6 of FIG. 1. Connect-disconnect type connectors 75 are shown connecting the battery means to the computer board 48 and input circuit board 64.

Figure 7:
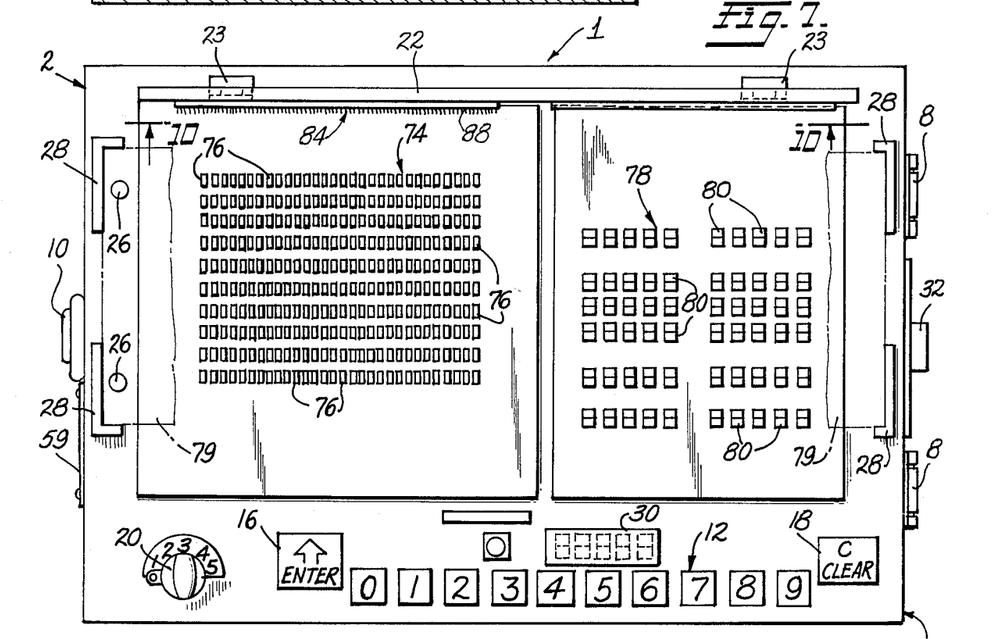
FIG. 7 is a plan top view of the billing device of FIG. 1 with the cover plate in the open position.

FIG. 7 is a top view of the billing device 1 with the cover plate 22 in the opened position. As illustrated, the reading means 74 comprises a plurality of sensing plates 76 arranged in a matrix array of 10 rows and 30 columns. To the right of the reading means 74 are printing means 78 which may, for example, take the form of a printing resistor circuit laminate comprising an array of resistor elements 80 utilized for thermal printing onto a customer card 79 such as that manufactured by Mica Corp. The customer card 79, partially shown in FIG. 7, comprises paper with thermally sensitive areas. The printing controller 54 and printing means 78 may, for example, comprise a Mica Corp. "Micaply Ohmega" thermal printing unit, while the customer card 79 may, for example, be treated in the printing area by the National Cash Register Thermographic process.

Figure 8:
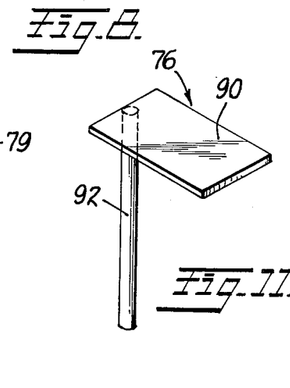
FIG. 8 is an enlarged illustration of a form of the bill which is provided by the central office to the operator.

FIG. 8 is an enlarged illustration of a customer card 79 which contains pertinent machine-readable customer information in the form of prepunched columns. The customer card may be, for example, a conventional IBM card. Human-readable indicia are provided in the form of alpha-numeric symbols which may be utilized to identify the customer and provide other data.

The "one of ten positions" card perforations in the customer card 79, and the 10 row, 30 column array of sensing plates 76 coupled to the BCD converters 40, allow the customers' cards to be prepared by standard IBM card punching equipment. However, in the event that the economies of scale allow non-standard card punching, then the cards may be punched in binary coded decimal format in which any combination of one to four holes are punched to indicate the digit. If such is the case, then only four of sensing plates 76 are required in each column (rather than 10) and the BCD converters 40 are not required, as the data from the customer's card can be directly transferred to the computing means 46.

Figure 9:
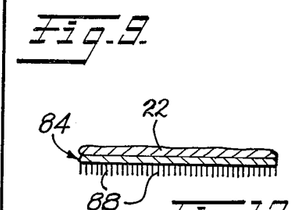
FIG. 9 is an illustration of the bill after utilization of the device of the instant invention and contains the total billing information for delivery to the customer.

FIG. 9 illustrates the completed customer card 79 after processing by the billing device 1. Various zones within the card are utilized to provide necessary information. In reference to FIGS. 8 and 9, for example, Zone A contains a ten-digit number used to identify the customer and his particular meter. Zone B has a three-digit number, the last digit of which identifies the particular rate for the commodity being billed. For example, a five may indicate an electric company rate. Optionally, two digits may be provided in place of the single last digit in Zone B so that up to twenty different billing rates may be employed. The first two digits within Zone B are utilized to indicate the percentage of time that a first billing rate applies during a dual rate period. Thus, if the rates have changed within a billing period the first two digits within Zone B will indicate the percentage of time at which the first billing rate applies. Of course, the human readable input information within Zones A and B as well as other input information are provided in machine readable form by means of the prepunched holes within selected columns of the card. Thus, the information available to the operator is also available to the computing means 46.

Zone C on the computing card represents the allowed kilowatt hours or other utility quantity which is available as may be used, for example, in a rationing type system. The present meter reading is shown in Zone D. The operator manually inputs this present meter reading information by means of keyboard 12 and this information forms part of the output data printed on the card. Zone E represents the previous meter reading and this data is supplied in the central office from prior records. Zone F displays the difference between the previous and present meter readings and represents the quantity of the utility utilized. Zone G gives the cost of the quantity used; Zone H is provided to indicate the excess use penalty; and Zones I and J display the rate tax and amount of tax respectively. Zone K is used to indicate the past amount due while Zone L is utilized to indicate the total bill now due. The card is perforated along line 82 and the right-hand portion is returned to the central office by the customer together with his payment. The left-hand portion of the card is retained by the customer for his own records.

Figure 10:
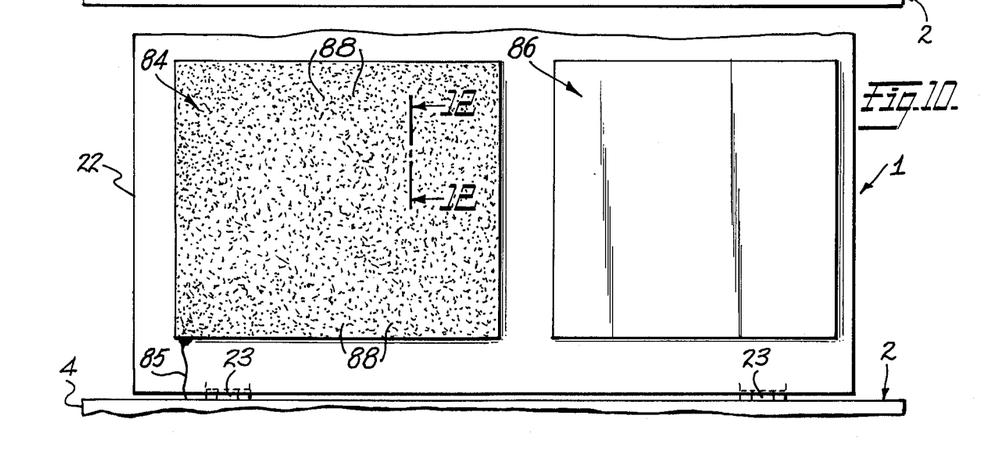
FIG. 10 is a plan view of the underside of the cover plate of the billing device taken along line 10—10 of FIG. 7.
Figure 11:
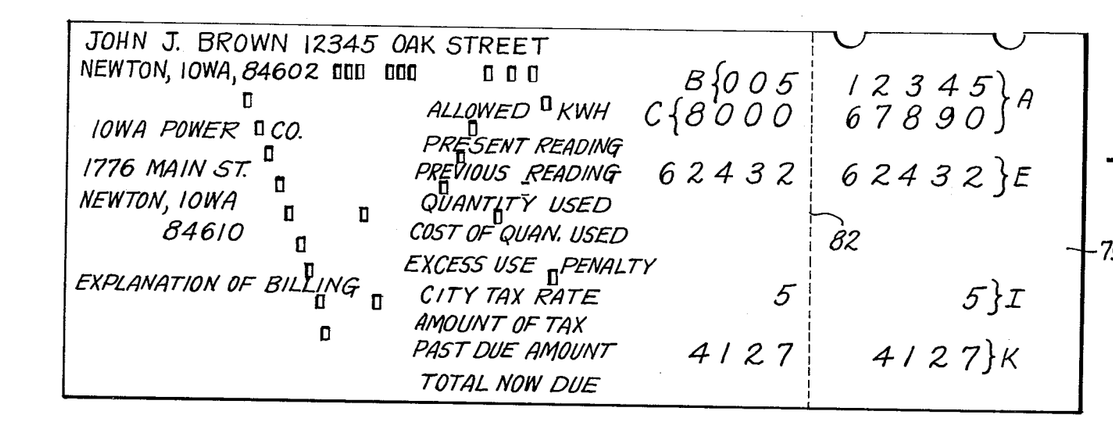
FIG. 11 shows an enlarged perspective view of the sensing plate utilized in the sensing means of the instant invention.
Figure 12:
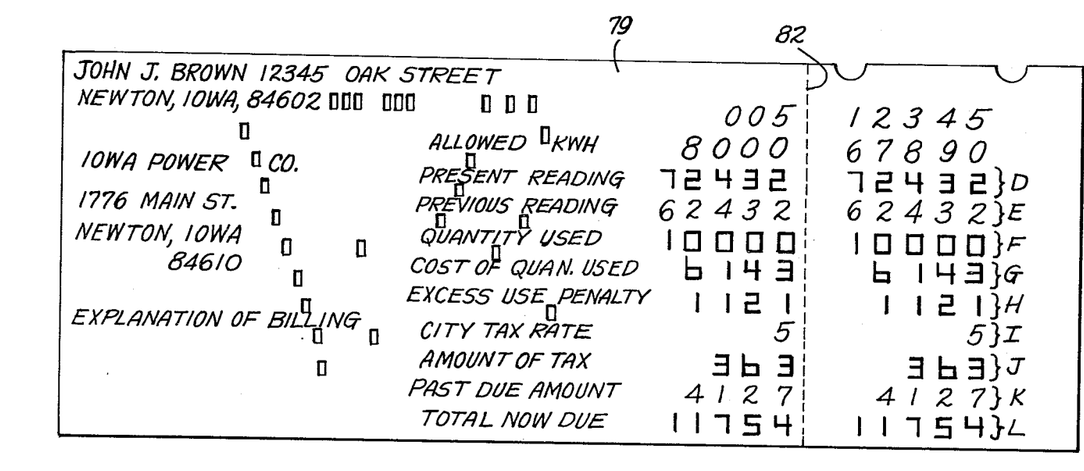
FIG. 12 is an enlarged partial view of the top plate of the billing device taken along line 12—12 of FIG. 10.

FIG. 10 shows the cover plate 22 of the billing device 1 as seen along line 10—10 of FIG. 7. The left-hand portion of the cover plate 22 has a contact plate 84 mounted thereon, and the right-hand portion of the cover plate 22 is provided with a pressure plate 86. Contact plate 84 is electrically connected to ground by means of insulating wire 85 and is provided with a plurality of electrically conductive bristles 88 as best illustrated in FIG. 12. These bristles protrude through the apertures punched into the customer card 79 and thus electrically connect to ground selected ones of the sensing plates 76. A sensing plate 76 is best illustrated in FIG. 11 and comprises a horizontal surface 90 together with a supporting rod 92 which provides for mechanical support as well as for electrical connection for the grounding signal along wire 85 to respective data converters 40.

The pressure plate 86 of FIG. 10 is utilized to bias the customer card 79 against the printing means 78 after the cover plate has been closed and held in its closed position by means of the cover plate clamp and actuator 24.

Figure 13:
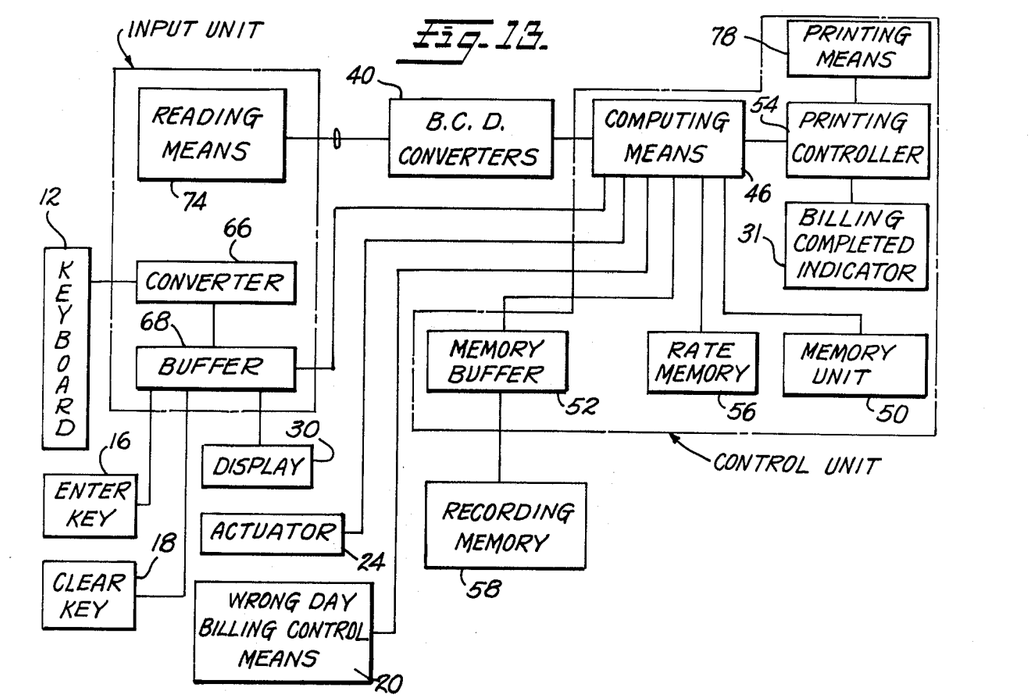
FIG. 13 illustrates a schematic of the overall electrical circuitry used in the billing device.

The overall electrical circuitry of the billing device 1 is schematically illustrated in FIG. 13. At the outset, the operator inserts the computer card into the apparatus and closes the cover plate 22 thus actuating the cover plate clamp and actuator 24 which energizes the input unit of the electronics and resets the memory unit 50 and memory buffer 52. A first group of input data is provided by the operator in the form of manually entered information utilizing the keyboard 12 and wrong day billing control means 20. The keyboard 12 is connected to the data converter 66 which converts the manually entered data into a form compatible with the computer means 46 and may be, for example, similar to the data converters 40. Input buffer 68 is connected to the converter 66 for storing the data temporarily and for feeding it to the display means 30 for operator verification. If the operator has entered the wrong present meter reading he may clear the buffer 68 together with the display means 30 by depressing the clear button 18 and re-entering the correct data. Once the correct data has been entered and displayed the operator depresses the data entry button 16 which energizes the rest of the electronics and feeds the information in input buffer 68 to the computing means 46. A second group of input signals is generated by means of the reading or sensing means 74 and is subsequently converted in the data converters 40 and fed to the computing means 46. The second group of data signals represents data information which are prepunched on the customer IBM card and represents, for example, the information contained in Zones A, B, C, E, I and K of FIG. 8.

Additional input data is provided by the wrong day billing control means 20 which is utilized in the event that the billing day is delayed by one or more days. If the operator has had time to arrive at the customer's home during the day billing is supposed to take place, the wrong day billing control means 20 is set to zero. If, however, a dual billing rate applies (the first two digits in Zone B of the customer card are non-zero), the wrong day billing control means 20 is set to the day that the operator is late in preparing the bill. Thus, if the operator has not been able to get to the particular customer's house for example for two days after receipt of the customer bill at the central office, the wrong day billing control means 20 is set to "two." Such information is provided to the computing means 46 by means of an additional signal so that the proper billing time interval may be computed for each of the two separate rates which are applicable.

The computing means takes the difference between the previous and present readings and calculates the quantity used and then multiplies this quantity by the applicable billing rate. The billing rate information is stored in memory storage means such as the rate memory 56. Appropriate sections of the rate memory are designated by the last digit of the three digit code contained in Zone B of the customer card. Output information from the computing means 46 is provided to the printing controller 54 which energizes selected resistors 80 in the printing means 78. When the thermal printing has been completed on the customer card 79 the printing controller 54 de-energizes the printing resistors 80 and energizes the "billing completed" lamp 31. The recording memory 58 is connected to the computing means 46 by means of the memory buffer 52 which temporarily stores selected data of the computing means. Recording memory 58 is utilized only to store part of the total output data from the computing means 46 and, in particular, the recording memory 58 stores the customer identification number (Zone A), the present meter reading (Zone D) and the total customer bill (Zone L).

FIGS. 14–19 show the memory maps associated with the various memories utilized in the billing device 1.

FIG. 14 shows the memory map for rate memory 56 which may store nine individual rates such as electric, gas, water, etc. Each rate is shown twice because of the possibility of a rate change during the billing period. Thus, for each rate data two memory locations are provided in rate memory 56. One memory location contains data applicable over a portion of the billing period and the other memory location contains data applicable over the remaining portion of the billing period. Information is stored in memory layers as indicated on the right of each row in FIG. 14 and memory layers are identified as M1–M20. An expanded diagram of the data appearing in column 5 is shown in the center of FIG. 14 whereas a detailed B.C.D. bit map is shown at the bottom of FIG. 14. Typical values are provided which may correspond, for example, to an electric utility company.

FIG. 15 shows the memory map for the memory unit 50 which stores selected information as indicated therein. This information is used during various stages of the calculations and data transfer of the computing means 46. Memory layers are identified at R1–R13.

FIG. 16 is the memory map associated with the printing controller 54 and provides memory storage for all of the output data which is printed on the customer card, namely, that data appearing in Zones D, F, G, H, J and L. Memory layers are labeled P1–P6.

FIG. 17 depicts the memory map associated with the memory buffer 52 and, as indicated, stores only selected data to be serially recorded in the recording memory 58. Memory layers are labeled S1–S5.

Figure 18:
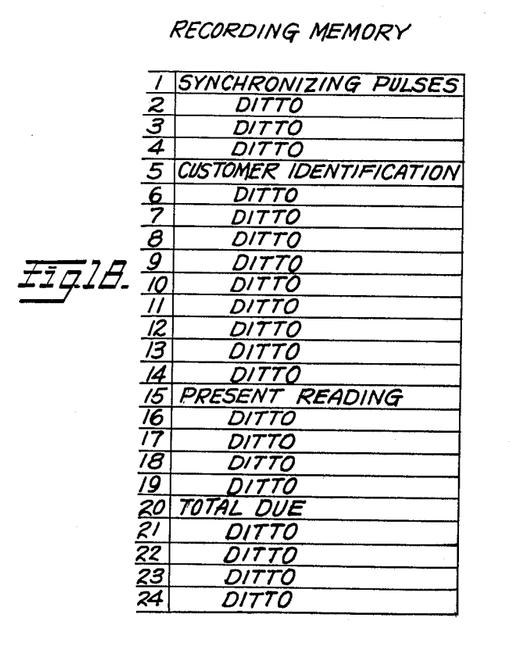
FIG. 18 illustrates a memory map of the recording memory utilized in the instant invention.

The memory map associated with the recording memory 58 is illustrated in FIG. 18. The recording memory stores initialization pulses together with selected data such as the customer identification, present meter reading and total due.

Figure 19:
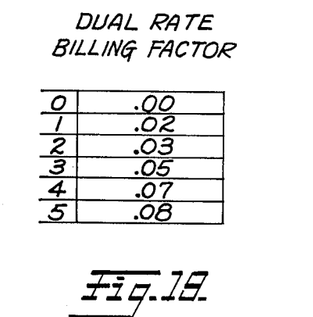
FIG. 19 illustrates a dual rate billing factor table of the instant invention.

FIG. 19 illustrates a typical billing factor associated with the wrong day billing as provided by the operator on the wrong day billing control means 20. This table illustrates the correction factor which is applied when the operator is from one to five days late in preparing a bill when a dual rate is applicable over the billing period.

Figure 20A:
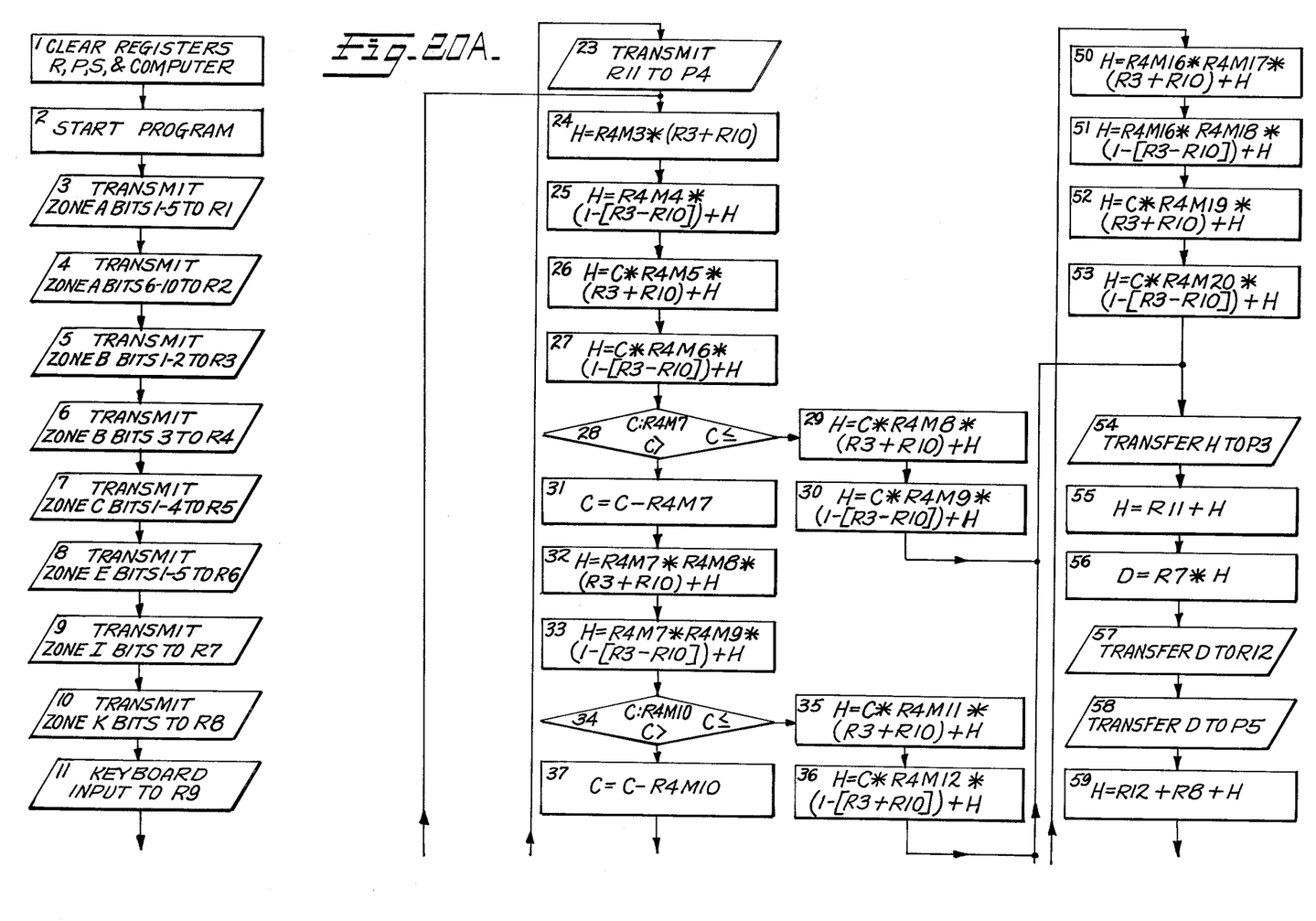
FIGS. 20A–20B illustrate a flow chart representative of details of the computer calculations of the billing device.
Figure 20B:
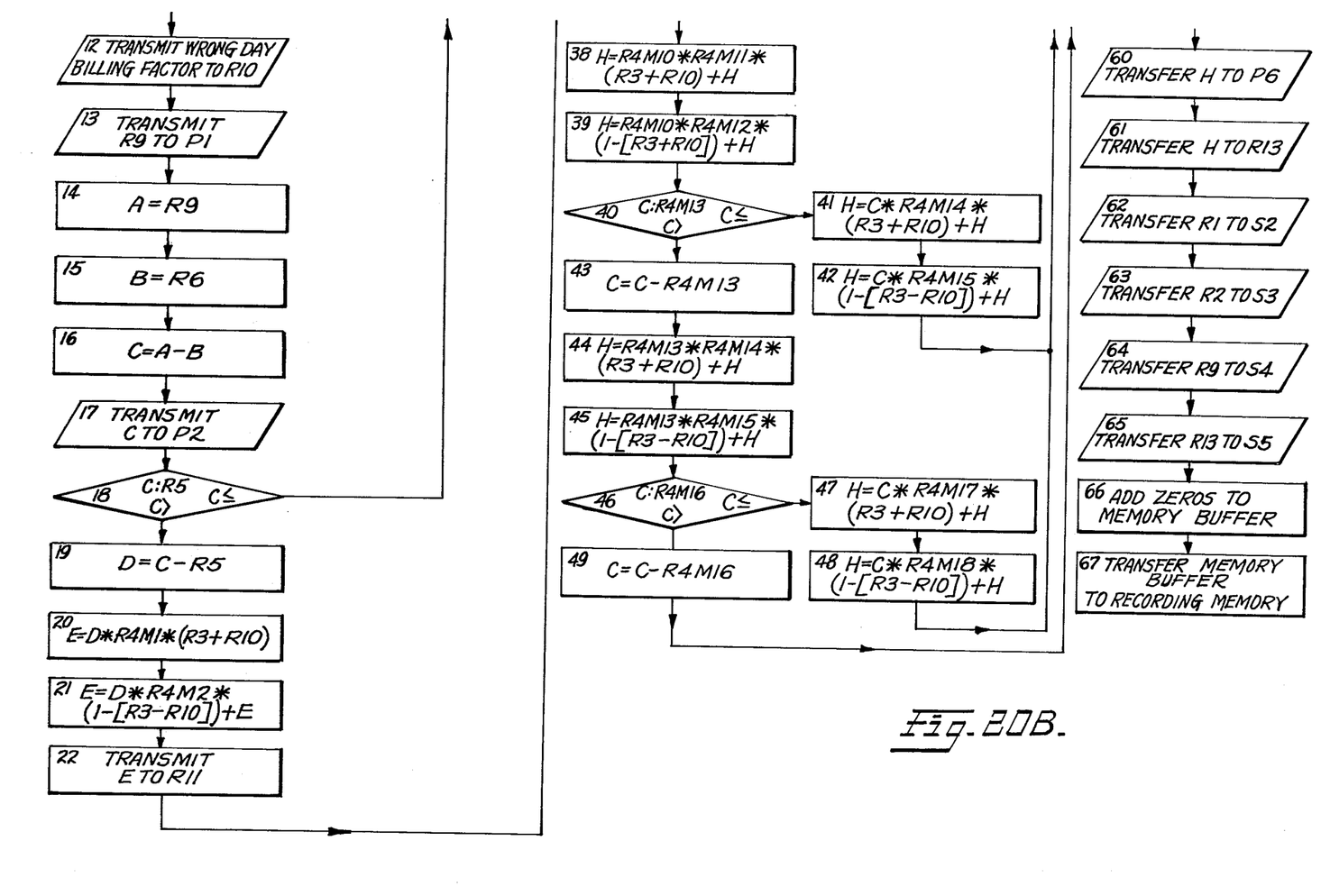

FIGS. 20A–20B show an exemplary flow diagram for programming the computing means 46 in reference to the memory maps set forth in FIGS. 14–19.

OPERATION

The operator carries the billing device 1 together with a number of customer utility cards such as illustrated in FIG. 8. A human readable customer name and street address identify the customer and particular utility in question. The operator first sets the wrong day billing control means 20 to indicate whether the billing is taking place on the proper day or is late by one day, two days, etc. The wrong day billing control means 20 may be set to indicate that the bill is as much as five days late. In practice, the wrong day billing control means 20 only has significance when a dual rate is applicable over the billing period. The existence of a dual rate is indicated by the non-zero numbers in the first two digits or bits of Zone B on the customer card. Thus, if two rates apply during the billing period, the first two digits of Zone B indicate the percentage of time in which the first billing period applies. If, however, the operator was not able to reach the customer's house on the day designated for billing but has arrived two days late, the operator must then set the wrong day billing control means 20 to indicate "two" which will apply a correction factor to the billing calculation as indicated, for example, in FIG. 19. Thus, the use of the wrong day billing control means 20 allows an additional flexibility to the billing device when a dual rate applies over the billing period. In the event billing is made on the date for which the customer's card was prepared or in the event that only one rate applies during the billing period, the wrong day billing control means 20 is left on zero.

After the wrong day billing control means 20 has been set, the operator opens the cover plate 22 and inserts the prepunched customer card in alignment with the raised members 28. Upon closing the cover plate 22, the cover plate clamp and actuator 24 secures the cover plate 22 in its closed position and turns on the input unit as shown in FIG. 13. The operator then reads the present meter reading and inserts this data into buffer 68 of the billing device 1 via keyboard 12 and converter 66. The data is subsequently displayed on the display means 30 and verified for accuracy by the operator. If the data is incorrect the clear button 18 is depressed and the buffer 68 as well as the display 30 are erased so that new data may be entered on the keyboard 12. Once the data is correctly entered and displayed, the enter button 16 is depressed. This energizes the computer means 46 and clears and resets the memory unit 50 and memory buffer 52, activates the control unit as shown in FIG. 13 and the BCD converters 40, and feeds this first group of data input signals that is temporarily stored in buffer 68 to the computing means 46.

It is pointed out that after the cover plate 22 is closed, and after the control unit of FIG. 13 is energized, reading means 74 automatically senses information on the customer card and provides a second group of input signals to the computing means 46. In particular, bristles 88 extend through the prepunched holes in the customer card and ground corresponding sensing plates 76 which form the matrix of the reading means 74. The grounded sensing plates 76 thus provide signals to their corresponding data converters 40 which subsequently feed compatible (B.C.D., for example) signals to the computing means 46. Computing means 46 carries out the necessary subtraction of the previous and present meter readings together with the necessary multiplication by the appropriate rate as stored in rate memory 56. The specific rate is designated by the last digit in the three digit code appearing in Zone B of the customer card. Nine such possible rates are shown in the rate memory map illustrated in FIG. 14.

After depression of the enter button 16, the calculations are made in accordance with, for example, the specific computer steps illustrated in FIGS. 20A and 20B and output data is automatically imprinted by means of the printing elements 80 of the printing means 78 which are caused to be energized by the printing controller 54. Then, upon completion of the printing cycle, the printing controller 54 causes the de-energization of the printing element 80 and energization of the "billing completed" indicator 31. Selected output information is also temporarily stored in the memory buffer 52 and subsequently recorded in the recording memory 58. Recording memory 58 is permanently connected to the battery means 60 and thus the data is retained therein even though the cover plate 22 may be subsequently opened for further processing of a new customer card.

Upon completion of the printing process as indicated by the indicator lamp 31 the operator opens cover plate 22 and inserts a new utility card for a different utility for the same customer or a new card for a different customer and repeats the above process. Once all of the utility cards have been completed for a given customer, the customer bills are left at the customer residence and the operator proceeds to the next location. The use of the recording memory 58 obviates the necessity of obtaining "hard copies" of duplicate customer bills which were delivered to the customer. In fact, the recording memory is utilized to record only the minimum amount of pertinent information so that the customer bill may be verified at the home office upon receipt of the stub forwarded with the customer payment. Thus, recording memory 58 need only store the customer identification, the present meter reading and the total customer bill for the particular utility in question. This reduces the necessary memory requirements for the recording memory and allows the billing to be small, compact and lightweight. In practice, the dimensions of the billing device 1 may be 10 inches long, 6½ wide and 3½ high. The entire computing and printing process for a particular utility takes approximately 7 seconds.

After the operator has made his complete rounds for the day, the recording memory may be separated from the housing 2 of the billing device 1 by separating the lower portion 6 from the upper portion 4. This is done simply by releasing the clamp 10 and separating the hinges 8. The lower portion 6 of the billing device thus may be left at the central office for processing at night or the following day while a different lower portion 6 having a "clear" recording memory 58 may be attached to the upper portion 4 so that the billing device is ready for use by the operator. Data is extracted from the power portion 6 of the billing device 1 by applying a cable (not shown) to the data collection terminal 32, and such data may then be stored in a central office computer memory. This data may be crosschecked in the central office with the customer card stub information returned with customer payment. The customer card stub data may itself be optically read by automated equipment in the central office for efficient data processing.

While a particular embodiment of the invention is shown and described, modifications may readily be made by those skilled in the art, and it is intended that the claims cover any such modifications which fall within the spirit and scope of the invention.

We claim:

1. A calculating and printing apparatus for preparing a printout on a customer card, said apparatus having electronic computing means for calculating output data signals from information on a customer card and stored predetermined data, said apparatus comprising:
   a. means for securing said customer card,
   b. operator controlled input means for providing first input signals representative of input data,
   c. means for automatically sensing information on said customer card and for providing second input signals corresponding hereto,
   d. means for feeding said first and second input signals to said computing means,
   e. memory storage means connected to said computing means for storing predetermined data,
   f. means for printing output data on said customer card corresponding to calculated output data signals from said computing means,
   g. recording memory storage means for recording at least some of said calculated output data signals, at least some of said first input data signals and at least some of said second input data signals,
   h. wherein said customer card is a utility customer card, at least some of said first input signals corresponds to a present meter reading, at least some of said second input signals correspond to a prior meter reading, said predetermined data stored in said memory storage means corresponds to rate data and said memory storage means comprises two memory locations for respective rate data stored, one memory location containing rate data applicable over a portion of a billing period and the other memory location containing rate data applicable over the remaining portion of the billing period, and
   i. wherein said apparatus further comprises wrong day billing control means for providing an additional signal to said computing means applicable for billing on a day other than the one for which said customer card was prepared.

2. A calculating and printing apparatus as recited in claim 1 wherein said recording memory storage means is separable from said apparatus.

3. A calculating and printing apparatus as recited in claim 1 wherein said customer card contains human readable information thereon and corresponding data information automatically sensed by said sensing means.

4. A calculating and printing apparatus as recited in claim 3 further comprising means for displaying indicia corresponding to said first input signals.

5. A calculating and printing apparatus as recited in claim 4 further comprising buffer storage means for storing said first input signals for display by said displaying means.

6. A calculating and printing apparatus as recited in claim 5 wherein said first input signals are stored in said buffer storage means prior to feeding to said computing means and said apparatus further comprising means for erasing said buffer storage means.

7. A calculating and printing apparatus as recited in claim 3 wherein said means for automatically sensing information on said customer card comprises means for sensing apertures in said customer card.

8. A calculating and printing apparatus as recited in claim 1 wherein said means for printing comprises means for heating localized regions of said customer card and said customer card is thermally sensitive.

9. A calculating and printing apparatus as recited in claim 1 wherein said operator controlled input means comprises a keyboard.

10. A calculating and printing apparatus as recited in claim 1 wherein said second input signals comprise data signals representative of the percentage of time said rate data stored in said one memory location is applicable during said billing period.

11. A calculating and printing apparatus as recited in claim 1 wherein said memory storage means comprises a read only memory.

12. A calculating and printing apparatus for preparing a printout on a customer card, said apparatus having electronic computing means for calculating output data signals from information on a customer card and stored predetermined data, said apparatus comprising:
   a. means for securing said customer card in a fixed position relative to said apparatus,
   b. operator controlled input means for providing first input signals representative of input data,
   c. means for automatically sensing information on said customer card and for providing second input signals corresponding thereto,
   d. means for feeding said first and second input signals to said computing means,
   e. means for printing output data on said customer card corresponding to calculated output data signals from said computing means,
   f. recording memory storage means for recording at least some of said calculated output data signals, at least some of said first input data signals and at least some of said second input data signals, and g. wherein said apparatus comprises a housing having a top surface and said means for securing said customer card comprises:

a cover plate having a hinged edge thereof secured to the top surface of said housing, and means for holding said cover plate in a closed position closely adjacent said top surface of said housing for biasing said customer card against said top surface.

13. A calculating and printing apparatus as recited in claim 12 wherein said means for holding comprises means for actuating said operator controlled input means.

14. A calculating and printing apparatus as recited in claim 12 which comprises data entry means for actuating said computing means and said sensing means.

15. A calculating and printing apparatus as recited in claim 12 wherein said sensing means and said printing means are operable while said customer card is in the same fixed position relative to said apparatus.

16. A calculating and printing apparatus as recited in claim 15 wherein said means for automatically sensing information on said customer card comprises means for automatically sensing apertures on said customer card.

17. A calculating and printing apparatus as recited in claim 16 wherein said cover plate comprises a first portion having electrically conductive means thereon, said electrically conductive means extending through said apertures when said cover plate is in a closed position.

18. A calculating and printing apparatus for preparing a printout on a customer card, said apparatus having electronic computing means for calculating output data signals from information on a customer card and stored predetermined data, said apparatus comprising:

a. means for securing said customer card in a fixed position relative to said apparatus, b. operator controlled input means for providing first input signals representative of input data, c. means for automatically sensing information on said customer card and for providing second input signals corresponding thereto, d. means for feeding said first and second input signals to said computing means, e. means for printing output data on said customer card corresponding to calculated output data signals from said computing means, and f. recording memory storage means for recording at least some of said calculated output data signals, at least some of said first input data signals and at least some of said second input data signals, said sensing means and said printing means being operable while said customer card is in the same fixed position relative to said apparatus, said means for automatically sensing information on said customer card comprising means for automatically sensing information on said customer card comprising means for automatically sensing apertures on said customer card, said apparatus further comprising a housing having a top surface and said means for securing said customer card comprising:

a cover plate having a hinged edge thereof secured to the top surface of said housing, and means for holding said cover plate in a closed position closely adjacent said top surface of said housing for biasing said customer card against said top surface, said cover plate comprising a first portion having electrically conductive means thereon, said electrically conductive means extending through said apertures when said cover plate is in a closed position, and said cover plate comprising a second portion having a flat surface for biasing said customer card against said printing means.

* * * * *